July 23, 1963 W. A. PAULSON 3,098,919
CONDITION CONTROL SYSTEM
Filed May 13, 1959

INVENTOR.
William A. Paulson
BY
Wolfe, Hubbard, Voit & Osann
ATTORNEYS

United States Patent Office

3,098,919
Patented July 23, 1963

---

3,098,919
CONDITION CONTROL SYSTEM
William A. Paulson, Rockford, Ill., assignor to Barber-Colman Company, Rockford, Ill., a corporation of Illinois
Filed May 13, 1959, Ser. No. 813,000
8 Claims. (Cl. 219—20)

The present invention relates to condition control systems and more particularly to means for limiting the output to a safe value at the end of the operating range.

In automatic temperature control systems in which heat is correctively supplied to achieve and sustain a desired temperature, it is often desirable to limit the rate of application of heat when starting from the "cold" condition. For example, where a furnace has heating elements whose resistance is low when the furnace is cold it is desirable to limit the amount of current flowing through the heating elements in order to protect the control elements in the system against overload or to prevent thermal shock which would damage the heating elements or the furnace. A further example relating to temperature control is to be found in systems for heating airplane windshields where it is necessary when starting from the "cold" condition to limit the rate at which heat is added to a value below that which might cause localized softening of the plastic material of which the windshield is constructed.

Analogous problems exist in the controlling of other variables. For example, in a water level control system it may be desirable to limit the rate of inrush of water under extremely low level conditions. In a humidity control system it may be desirable to limit the maximum rate at which water is sprayed into the air. Accordingly, in considering the present invention it is helpful to view the invention as broadly applicable to condition control and in terms of standard control terminology. Thus, in the description and claims reference is made to a "primary sensing element" which, in the case of a temperature control system may be a temperature sensitive resistor. The condition to be controlled is referred to generally as the "controlled variable." The factor which is changed in order to bring about a change in the controlled variable, in the present instance the current which produces the heat, is referred to as the "manipulated variable." The saturable reactor which controls the current is referred to as the "final control element."

It is a general object of the present invention to provide a control system which includes novel means for limiting the magnitude of the manipulated variable to a safe value. It is a more specific object to provide a novel temperature control system in which the rate of liberation of heat under cold, starting conditions is limited to a level which will prevent damaging the heating units or the like.

It is another object of the present invention to provide a novel condition control system which is stable in operation even in the face of wide variations in loading and which is rapid in response permitting employment of amplifiers having high gain and long time constant while avoiding many of the problems usually associated with use of the latter.

It is a further object of the present invention to provide a condition control system which is capable of controlling large amounts of power at the output but which nevertheless uses control components of limited power rating and low cost, components which are commonly available building-blocks in control technology.

It is still another object of the present invention to provide a condition control system of the static type which not only includes novel provision for limiting but in which the limiting means is particularly suitable for use with a magnetic amplifier. In this connection it is an object to provide a limiting type of control system which may employ a high gain magnetic amplifier of standard design and which does not require the amplifier to be modified in any substantial respect.

It is a more specific object to provide an automatic condition control system in which the point of limiting may be established with a high degree of precision and in which the limiting takes place reliably even over long periods of use without necessity for maintenance or readjustment. It is a related object of the invention to provide a condition control system in which the point of limiting may be set by single movement of a manual control knob, calibrated if desired.

Finally, it is an object to provide a condition control system with provision for limiting the manipulated variable employing a transistor for control purposes and in which the transistor is operated under conditions which insure against overload and which promote long transistor life. In greater detail it is an object to provide a novel condition control system which makes use of changes in the output impedance of a transistor for changing the gain of an amplifier for purposes of limiting.

Other objects and advantages of the invention will become apparent upon reading the attached detailed description and upon reference to the drawings in which.

Figure 1:
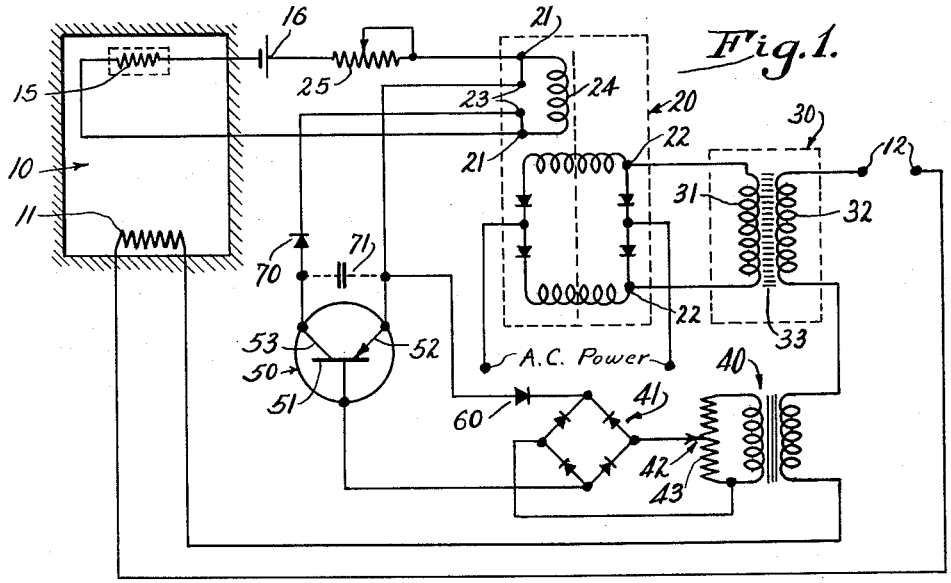
FIGURE 1 is a schematic diagram of a condition control system constructed in accordance with the present invention.

While the invention has been described in connection with a preferred embodiment, it will be understood that I do not intend to limit the invention to such embodiment but intend to cover the various alternative and equivalent arrangements included within the spirit and scope of the appended claims.

Turning to the drawing, the invention has been disclosed in connection with temperature control in a furnace or oven 10 having one or more heater elements 11 supplied from an A.-C. source 12.

For the purpose of sensing the temperature in the oven a primary sensing element is provided in the form of a temperature-responsive resistor 15 in series with a suitable source of voltage 16, with the result that the current, or the temperature signal, increases and decreases in accordance with the changes in temperature. It will be apparent to one skilled in the art that the sensing element may be replaced by some other means producing a change in current or voltage in response to changes in temperature, for example, a thermocouple having an electronic "preamplifier," and any desired means may be used to establish the control point.

For amplifying the output signal from the sensing element 15, an amplifier 20 is provided having a pair of input terminals 21, a pair of output terminals 22, and a pair of auxiliary control terminals 23. With the exception of the auxiliary terminals, this amplifier is preferably of the well-known magnetic type of which many examples may be found in the literature, for example, as shown in Magnetic Amplifiers by H. F. Storm, Wiley, 1955, p. 253. It includes a control winding 24 in series with a resistor 25, which preferably has a resistance greater than the resistance of the control winding for a purpose which will later become clear. The resistor 25 may be located outside of the amplifier if desired, and may be dispensed with entirely if the sensing element itself has a resistance which is substantially higher than that of the control winding 24. The magnetic amplifier in a practical case may be so constructed that varying the input current over the range of 1 to 14 milliamperes is effective to vary the output current from about one-tenth to about one and a half amperes when feeding a load having a resistance on the order of 50 ohms. This amounts to current amplification of about 100.

The output of the amplifier is coupled to a saturable reactor 30 which forms the final control element in the present control system. This saturable reactor has a control winding 31, an output winding 32 and a saturable core 33. A saturable reactor of modern design controlled by currents within the range of zero to one and one-half or two amperes is capable of controlling appreciable amounts of power fed into a resistive load circuit. In a practical case a saturable reactor 30 may be employed which, with a supply voltage of about 240 volts and a load circuit having a resistance on the order of 4.0 ohms, is capable of varying the current between seven amperes and fifty amperes. The output winding is, as shown, connected in series with the heating element 11 and a source of power 12 which may be a conventional A.-C. supply line.

It will be apparent to one skilled in the art that any change in temperature in the oven causes a change in the input current of the amplifier resulting in change in the control current supplied to the saturable reactor so that the manipulated variable, i.e., the load current, is correctively changed to increase or decrease the amount of heat being liberated within the oven and thereby to bring back the temperature to the predetermined control point. It will also be apparent that under cold "start up" conditions the sensing element 15 will call for heat, producing a large signal, a signal which, when amplified, will substantially saturate the reactor 30 with the result that a high current tends to flow in the heater circuit. The latter produces a sudden and excessive liberation of heat which runs the risk of damaging the furnace and heater elements. Also, since the resistance of some heater elements is especially low when cold, the temporary inrush current may be particularly high and objectionable and may damage the reactor.

In accordance with the present invention means are provided for constantly measuring the manipulated variable, here the load current, and for causing values of the manipulated variable beyond a predetermined level to react upon the amplifier thereby to reduce the gain of the amplifier to a value which will limit the amplifier output, and hence the manipulated variable, to a safe value. More specifically, means are provided for producing an auxiliary voltage as a measure of the load current and for causing values of voltage greater than a predetermined magnitude to effectively shunt the control winding of the amplifier with a low resistance, thereby substantially reducing the gains of the amplifier under the excess current condition. In the present instance the auxiliary voltage is produced by a current transformer 40, the output of which is fed into a bridge rectifier 41. In order to select a predetermined portion of the auxiliary voltage for control purposes, a potentiometer 42 is provided at the output of the transformer in series with a resistor 43. The resistor 43 determines the operating range of the potentiometer.

Figure 2:
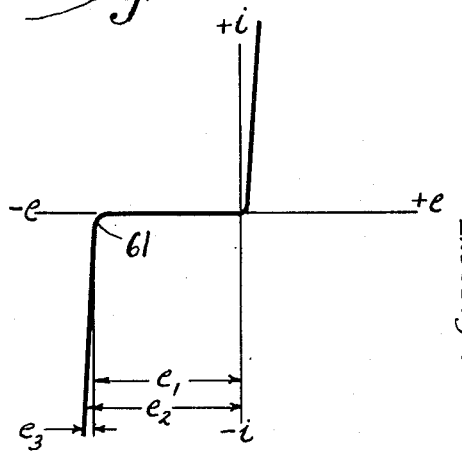
FIG. 2 shows the characteristic of a Zener type diode employed in the circuit of FIG. 1.

In the present instance the shunting of the control winding in response to the auxiliary voltage is accomplished by a transistor 50, the output circuit of which is connected to the terminals 23 and directly across the winding 24 as shown. The transistor includes a base 51, an emitter 52, and a collector 53. To insure that the transistor becomes conductive only under excess current conditions while constituting a substantially open circuit within the normal range of load current, a gating element or reference element 60 is arranged in series with the transistor input circuit having the characteristic that breakdown occurs when a predetermined voltage is reached. For the purpose I propose to use a diode of the Zener type available as IN469. The characteristic of a typical Zener diode is shown in FIG. 2. Here it will be noted that when operating on the left hand portion of the characteristic curve a voltage $e_1$ must be exceeded by an auxiliary voltage $e_2$ before any significant current is permitted to flow. Upon exceeding such voltage, breakdown occurs as indicated at 61 and the diode thereafter exhibits a constant voltage drop regardless of the current which may flow in the circuit. Since the auxiliary voltage is in series with the constant voltage drop of the diode following breakdown, a net differential direct voltage $e_3$ will be applied across the input circuit, i.e., the emitter-base circuit of the transistor.

Figure 4:
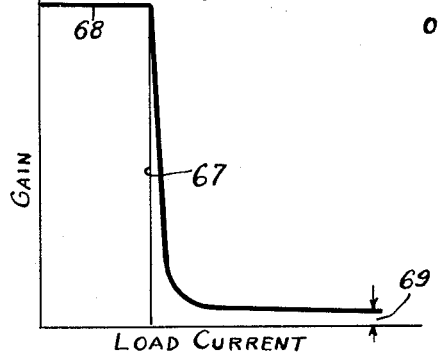
FIG. 4 shows the variation in system gain as a function of load current.
Figure 3:
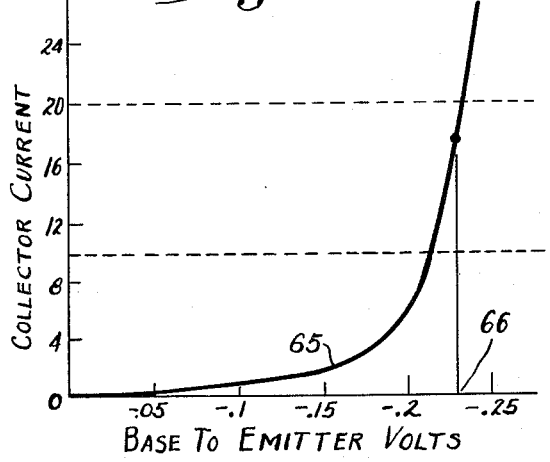
FIG. 3 is a plot of the transistor transfer characteristic.

A high gain transistor should be chosen for this application in which a small base-emitter voltage is capable of producing a low saturation resistance in the output or collector-emitter circuit. The desired characteristic is shown in FIG. 3 where it will be noted that with less than −0.1 volt base voltage the output current 65 is low, below one milliampere, whereas with a base voltage in excess of the value indicated at 66, which may be on the order of −0.23 volt the collector current increases rapidly. Or, stated another way, the collector-emitter resistance drops to a low value on the order of 50 ohms. A characteristic along this line is to be found in available commercial transistors, for example, of the PNP type identified as 2N382 and 2N379. With the transistor saturated at a low value of output resistance, a large portion of the input signal is shunted away from the control winding. The increased current which tends to flow in the input circuit causes an increased voltage drop through the input resistor 25. Thus, the control signal is less effective to produce an amplified signal at the output of the amplifier. As shown in FIG. 4, this effectively produces a change in gain from the relatively high value 68 to the lesser value 69 for values of load current exceeding that shown at 67. In practice, a change in gain from 100 down to 5 may be achieved using inexpensive and readily available transistors and diodes.

In short, the series resistance 25 in the input circuit produces a condition of "poor regulation" which intentionally dissipates some of the input signal depending upon the shunt impedance of the transistor. Where the sensing element has a relatively high resistance the series resistor may, as stated, be dispensed with while still employing the teachings of the invention.

In a practical magnetic amplifier, a small A.-C. voltage component will be induced in the control winding. In order to prevent the collector junction of the transistor from rectifying this A.-C. component, an auxiliary diode 70 is provided in series with the collector 53. Where it is desired to keep the resistance in the output circuit of the transistor just as low as possible, substantially the same result may be achieved by dispensing with the diode and by employing instead, a shunt capacitor 71 which offers low impedance at the ripple frequency and thereby tends to "short out" the ripple. The type of magnetic amplifier will determine which method is preferable.

It is found that the circuit disclosed in FIG. 1 is stable even when using high gain, long time constant amplifiers and even where the resistance of the load circuit undergoes a wide swing incident to controlling the energization of the heater winding 11. It is found that extremely sharp and precise limiting may be achieved, with the point of limiting being readily established by manually setting the potentiometer 42. Since all of the components are static, the system may be used indefinitely without maintenance or adjustment.

In the following claims the term "safe" as applied to the magnitude of the manipulated variable is that value which, if exceeded, would cause possible damage to the apparatus. The term "continuously" as used in the claims for the purpose of making it clear that limiting occurs automatically by operation of the circuit itself whenever the value of the manipulated variable, here current, tends to exceed the predetermined limit condition, without cutting off the flow and without requiring manual reset.

I claim as my invention:

1. In a control system for controlling a variable condition, the combination comprising sensing means for sensing the condition, a magnetic amplifier coupled to said sensing means, said magnetic amplifier having a control winding and an output, final control means including a saturable reactor coupled to the output of said magnetic amplifier for varying a manipulated variable and thereby correctively controlling said condition, means for producing an auxiliary voltage which varies in accordance with the output current of the saturable reactor, and means responsive to said auxiliary voltage's exceeding a predetermined value for acting upon said control winding so that the gain of the magnetic amplifier is reduced whereby the output current of the saturable reactor is continuously limited to a safe value.

2. In a control system for controlling a variable condition, the combination comprising means for sensing the condition, an amplifier having an input circuit and to an output circuit with the input circuit being coupled to said sensing means, said amplifier having auxiliary control terminals for shunting the amplifier and reducing the gain thereof as the shunting resistance between said terminals is lowered, final control means coupled to the output circuit of said amplifier for varying a manipulated variable for corrective control of said variable condition, a transistor having an input and an output, the output of said transistor being shunted across the auxiliary control terminals, and means responsive to said manipulated variable's reaching a predetermined high value for applying a voltage to the input of said transistor which is sufficient to substantially reduce the effective resistance of the output of said transistor with consequent reduction in the gain of the amplifier so that the manipulated variable is continuously maintained within safe limits.

3. In a control system for controlling a variable condition, the combination comprising means for sensing the condition, a magnetic amplifier coupled to said sensing means, final control means coupled to the output of said amplifier for varying a manipulated variable for corrective control of said variable condition, said magnetic amplifier having a control winding, a transistor having an input and an output, the output of said transistor being shunted across the control winding, and means responsive to said manipulated variable's reaching a predetermined high value for applying a voltage to the input of said transistor which is sufficient to substantially reduce the effective resistance of the output of said transistor with consequent reduction in the gain of the magnetic amplifier so that the manipulated variable is continuously maintained within safe limits.

4. In a control system for controlling a variable condition, the combination comprising means for sensing the condition, a magnetic amplifier coupled to said sensing means, final control means coupled to the output of said amplifier for varying a manipulated variable for corrective control of said variable condition, said magnetic amplifier having a control winding, a transistor having an input and an output, the output of said transistor being shunted across the control winding, and means responsive to said manipulated variable's reaching a predetermined high value for applying a voltage to the input of said transistor which is sufficient to substantially reduce the effective resistance of the output of said transistor with consequent reduction in the gain of the magnetic amplifier so that the manipulated variable is continuously maintained within safe limits, and means in the output circuit of the transistor for effectively isolating the transistor from alternating current in the control winding.

5. In a control system for controlling a variable condition, the combination comprising means for sensing the condition, an amplifier having an input circuit coupled to said sensing means, said amplifier having a gain control circuit provided with auxiliary control terminals for controlling the gain of the amplifier in accordance with the resistance in the circuit of the control terminals, final control means coupled to the output circuit of said amplifier for varying a manipulated variable for corrective control of said variable condition, said gain control circuit including a transistor having an input and an output, the output of said transistor being coupled to the auxiliary control terminals for varying the resistance in the circuit of the latter, and means responsive to said manipulated variable's reaching a predetermined high value for applying a voltage to the input of said transistor which is sufficient to substantially change the effective resistance of the output of said transistor with consequent reduction in the gain of the amplifier so that the manipulated variable is continuously maintained within safe limits.

6. In a control system for adjusting a variable condition to a desired value, a sensing means for supplying an input signal of amplitude increasing with the condition deviation from the desired value, an amplifier having an input circuit coupled to said sensing means for amplifying said input signal, signal attenuating means in said input circuit for sharply reducing the signal input level when the attenuating means is rendered effective, means for energizing a control agent source in accordance with the amplified signal to correct the condition deviation, and means responsive to a control agent energization level in excess of a selected maximum value for rendering the attenuating means effective whereby the amplifier gain is effectively limited until said control agent energization level no longer exceeds said selected maximum value.

7. In a control system for adjusting a variable condition to a desired value, a sensing means for supplying an input signal of amplitude increasing with the condition deviation below the desired value to a pair of input terminals, an amplifier connected to said input terminals for amplifying said input signal, means for energizing a control agent source in accordance with the amplified signal amplitude to correct the condition deviation, a normally high-resistance shunt means connected across said input terminals having an adjustable control voltage point above which the shunt resistance sharply decreases to a low value to decrease the effective amplifier gain, and means for deriving a shunt resistance control voltage directly responsive to the control agent energization level.

8. In a control system for controlling a variable condition, the combination comprising sensing means for providing a condition responsive signal, amplifying means including a pair of input terminals coupled to said sensing means, a final control element coupled to said amplifying means for varying a manipulated variable for corrective control of the condition, a controlled impedance signal shunt means coupled to said input terminals, and shunt control means coupled to said final control element for sharply reducing the shunt impedance in response to the exceeding of a predetermined magnitude of the manipulated variable to thereby limit the manipulated variable when the variable condition exceeds a given level.

References Cited in the file of this patent

UNITED STATES PATENTS

| | | |
|---|---|---|
| 2,514,935 | Clapp | July 11, 1950 |
| 2,629,786 | Ingalls | Feb. 24, 1953 |
| 2,761,052 | Knudsen | Aug. 28, 1956 |
| 2,872,556 | Obermaier | Feb. 3, 1959 |
| 2,875,382 | Sandin et al. | Feb. 24, 1959 |
| 2,886,755 | Ehret et al. | May 12, 1959 |
| 2,896,057 | Grant | July 21, 1959 |
| 2,933,672 | Jones | Apr. 19, 1960 |
| 2,957,111 | Schaeve et al. | Oct. 18, 1960 |

OTHER REFERENCES

Davis et al.: Electronics; February 1, 1957; vol. 30, No. 2, pp. 164–167.